June 12, 1934. W. A. WELCHMAN 1,962,629
BODY OF TRUCKS, WAGONS, AND THE LIKE
Filed Aug. 19, 1931
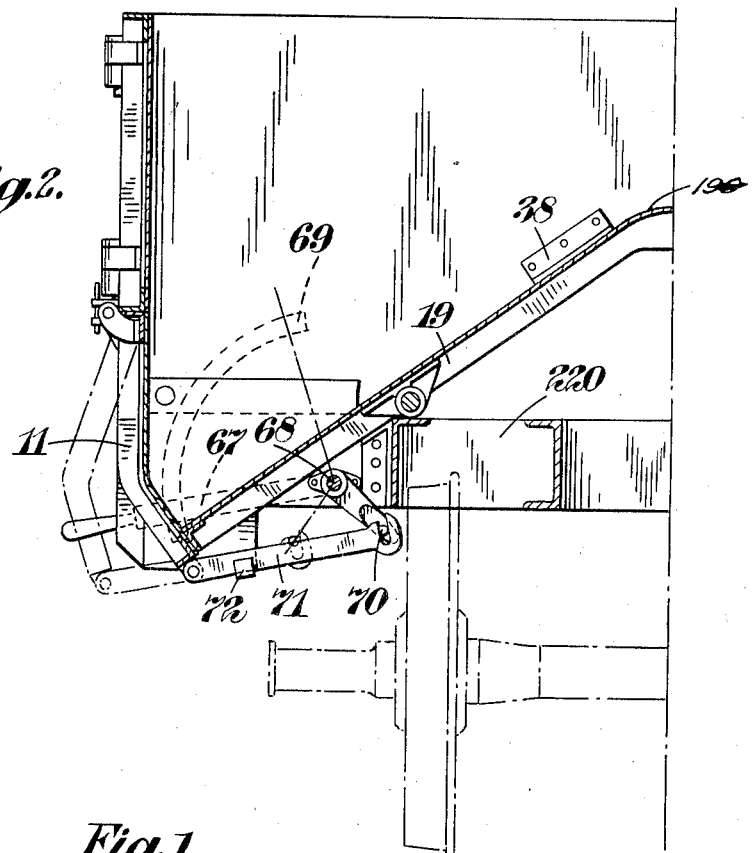
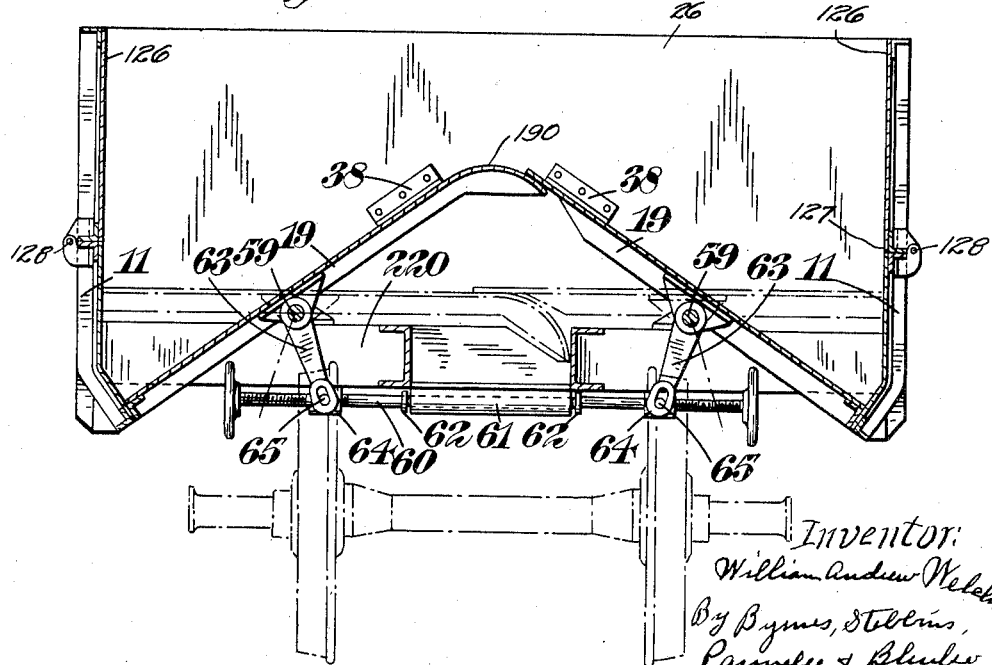

Patented June 12, 1934

1,962,629

UNITED STATES PATENT OFFICE 1,962,629

BODY OF TRUCKS, WAGONS, AND THE LIKE

William Andrew Welchman, London, England

Application August 19, 1931, Serial No. 558,122
In Great Britain August 19, 1930

3 Claims. (Cl. 105—246)

The present invention is for improvements in or relating to bodies of trucks, wagons and the like and is applicable to such vehicles whether mechanically or otherwise driven and whether used for road railway or transport purposes.

The object of the invention is to provide a single body for a truck or like vehicle, which is capable of accommodating different types of goods and discharging them through the sides of the truck. According to the present invention a vehicle body comprises a longitudinally divided floor wherein the parts of the floor are hinged or pivotally attached to a relatively fixed part of the vehicle body or frame at a position outwardly of the inner-edges of the parts of the floor so that they are adjustable relatively to the side walls of the body, combined with means to raise or lower the inner edges of the floor (e. g. to a plurality of different inclined positions) independently of the side walls and to maintain said part or parts in the desired adjustment. By means of the present invention it is possible, if desired, to adapt the body to accommodate different materials and to enable it to be adjusted so that for each material the slope of the floor is approximately the minimum necessary to ensure that all the material will slide off it.

In order to keep the centre of gravity of the truck constant, whether the floor is in the flat or in the dumping position, each part of the floor is hinged or pivotally attached to a relatively fixed part of the vehicle body or frame at a point approximately midway between the centre line of the vehicle and the outer edges of the floor parts. In order to enable the contents of the truck to be discharged, the side walls thereof may be hinged so as to open outwardly.

An apex member may be provided to fill the gap between the inner edges of the sections of the floor (when the latter are in their raised positions) and the apex member may serve as means for raising the sections of the floor.

One specific example of the invention will now be described with reference to the accompanying drawing, in which Figure 1 is a cross-sectional elevation of a rail wagon made in accordance with the invention, and Figure 2 is a cross-section through a rail-wagon showing an alternative construction for opening and closing the sides.

Like reference numerals refer to like parts throughout the several figures of the drawing.

In Figure 1 there is shown a preferred construction applied to a railway wagon, but of course the same idea could be equally well used on a road vehicle.

In this modified construction floor sections 19 are hinged or pivoted on a bar 59 to the members 220 at a point approximately mid-way between the inner and outer edges of each section respectively.

The lifting arrangement comprises a shaft 60 extending transversely of the body. The shaft 60 is supported by a bracket 61, and is provided with stops 62 which are arranged to allow a very small endwise movement.

The shaft is provided with a left-hand thread at one end, and a right-hand thread at the other end. Two arms 63 fixed to the floor sections 19 and rotatable about the bar 59 engage with nuts 64 in threaded engagement with the bar. In order to permit the arms to swing in a vertical plane either the arms 63 are provided with elongated slots for the pins 65 on the nuts or else the shaft 60 is allowed to move vertically in the bracket 61 enough to permit the free movement of the arms 63.

In this construction there is a member 190 formed integral with one of the floor parts. A separate apex member secured to the floor part 19 could be employed if desired.

The truck is provided with fixed ends 26 and fixed side walls 126 to form the upper part of the body. The fixed side walls 126 terminate at 127 slightly above the level of the floor parts 19 when the latter are in their horizontal position and here support hinges 128 which connect them to door sections 11 which constitute the lower part of the sides of the truck. The door sections 11 are bent inwardly towards their bottom part so that they fit closely against the floor parts 19 when the latter are in their horizontal position and also when they are in their inclined position as shown in the figure. Consequently, the truck is capable of being run either as a flat bottom truck with the floor parts horizontal or as a hopper bottom truck with the floor parts inclined. The bottom door-sections 11 of the side walls are provided with means to lock them from hinging outwardly which means can be released when desired so that they constitute discharge doors for the contents when the truck is used as a hopper bottom car.

By constructing the body and floor in this manner, it is possible to keep the centre of gravity of the truck at the same level and also to keep the cubic capacity of the truck constant, whatever position the floor sections may be in.

In Figure 2 there is shown an alternative construction for opening and closing the lower hinged door sections 11. It comprises a lever 67 mounted to pivot about a pin 68. The lever can move round an arcuate member 69 provided with means for holding the lever 67 at any position on the member 69.

At the opposite end of the lever 67 there is a pin 70 which engages with an arm 71 pivoted to the side 11. A bracket 72 is provided to hold the arm 71 in position.

It will be seen that as the lever 67 is moved round, the side 11 is gradually pushed open. The amount of the opening can be regulated by locking the lever 67 in the desired position on the member 69.

I claim:—

1. A vehicle body comprising in combination a longitudinally divided floor, the parts of which are capable of lying flat in one plane but are tiltable to lift their adjacent edges and constitute a discharge body, a curved apex member integral with one of the floor parts fitted across the junction of the floor parts so as to underlie and fit closely against the underside of the adjacent edge of the other floor part and permit of angular relative movement thereof while fitting the same closely in all angular positions and preventing passage of material through the junction, and sides to the vehicle body which are hinged along their upper edges and extend downwardly to fit against the floor parts in both their flat and their tilted positions.

2. A vehicle body as claimed in claim 1, wherein the floor parts are pivoted about axes lying intermediate between their inner and outer edges.

3. A vehicle body comprising in combination fixed sides and ends, hinged extensions to the underside of the sides which extend downwardly therefrom to fit against floor parts of the vehicle, two longitudinally divided floor parts mounted on pivots lying intermediate their edges so that they may tilt into a position where their central edges are raised and outer edges depressed, said hinged extensions to the sides of the vehicle being formed to fit against the floor parts both in their horizontal and tilted positions, a curved apex member on one of the floor parts to fit across the junction thereof with the other floor part so as to underlie and fit closely against the underside of the same in all angular positions thereof, means to tilt the floor parts and means to hold or to release at will the hinged downward extensions of the sides of the vehicle body.

WILLIAM ANDREW WELCHMAN.